United States Patent
Douglas et al.

(10) Patent No.: US 7,273,073 B2
(45) Date of Patent: Sep. 25, 2007

(54) METHOD AND DEVICE FOR THE PROTECTION OF A PIPE PORTION

(75) Inventors: Kevin Douglas, Ann Arbor, MI (US); Mark Bradley, Ann Arbor, MI (US); Charles W. Kennedy, Ann Arbor, MI (US); Frank Rampton, Ann Arbor, MI (US)

(73) Assignee: The Trenton Corporation, Ann Arbor, MI (US)

( * ) Notice: Subject to any disclaimer, the term of this patent is extended or adjusted under 35 U.S.C. 154(b) by 225 days.

(21) Appl. No.: 10/925,026

(22) Filed: Aug. 24, 2004

(65) Prior Publication Data

US 2005/0081934 A1   Apr. 21, 2005

Related U.S. Application Data

(60) Provisional application No. 60/497,630, filed on Aug. 25, 2003, provisional application No. 60/557,010, filed on Mar. 26, 2004.

(51) Int. Cl.
*F16L 55/16* (2006.01)
(52) U.S. Cl. .......................................... 138/99; 138/172
(58) Field of Classification Search ................. 138/99, 138/97, 172
See application file for complete search history.

(56) References Cited

U.S. PATENT DOCUMENTS

| 2,924,546 | A | * | 2/1960 | Shaw ........................... 156/94 |
| 3,177,528 | A | | 4/1965 | Flower et al. |
| 3,214,509 | A | | 10/1965 | Hugo |
| 3,367,358 | A | | 2/1968 | Rentschler |
| 3,525,656 | A | | 8/1970 | Kennedy, Jr. |
| 3,625,259 | A | | 12/1971 | Kennedy, Jr. |
| 4,442,053 | A | | 4/1984 | Pickering et al. |
| 4,469,469 | A | | 9/1984 | Kennedy, Jr. |
| 4,559,974 | A | * | 12/1985 | Fawley ........................ 138/172 |
| 4,756,337 | A | * | 7/1988 | Settineri ........................ 138/99 |
| 5,540,985 | A | | 7/1996 | Kennedy, Jr. |
| 5,732,743 | A | * | 3/1998 | Livesay ........................ 138/99 |
| 5,894,864 | A | * | 4/1999 | Rich ............................ 138/99 |
| 6,276,401 | B1 | * | 8/2001 | Wilson ........................ 138/172 |
| 6,336,983 | B1 | * | 1/2002 | Fawley ........................ 156/94 |
| 2005/0081934 | A1 | | 4/2005 | Douglas et al. |

FOREIGN PATENT DOCUMENTS

FR         2699984         7/1994

OTHER PUBLICATIONS

Royston, Handy Cap™ "Corrosion Protection for Exothermic Grounding Connections".
Excerpt from website www.apsonline.com/bandprotectors.html.

(Continued)

*Primary Examiner*—Patrick F. Brinson
(74) *Attorney, Agent, or Firm*—Dobrusin & Thennisch PC (57) ABSTRACT

The present invention provides a method, device and tools for the protection of cadmium welds, holidays or the like on underground pipe portions, wherein the device includes a patch having a fibrous material and a hydrophobic agent that is adapted to form a substantial seal about the pipe portion or otherwise coat the pipe portion with an anti-corrosion agent upon application.

27 Claims, 11 Drawing Sheets

OTHER PUBLICATIONS

Excerpt from website www.apsonline.com/sprayshields.html.
Excerpt from website www.asponline.com/radolid.html.
Copending U.S. Appl. No. 11/144,333, filed Jun. 3, 2005 (1183-002).
Copending U.S. Appl. No. 11/255,286, filed Oct. 20, 2005 (1183-003).
Copending U.S. Appl. No. 11/420,626, filed May 26, 2006 (1183-017).

* cited by examiner

METHOD AND DEVICE FOR THE PROTECTION OF A PIPE PORTION

RELATED APPLICATIONS

The present application claims benefit to the subject matter of commonly owned U.S. Provisional Patent Application Ser. No. 60/497,630 (filed on Aug. 25, 2003) and U.S. Provisional Patent Application Ser. No. 60/557,010 (filed on Mar. 26, 2004), the contents of which are hereby incorporated by reference in their entirety.

TECHNICAL FIELD

The field of the present invention relates to a method, device and tool for the protection and/or substantial sealing of members from moisture existing in a surrounding environment. More particularly, in one aspect the present invention relates to the patching of lead attachment welds and coating holidays (i.e., breaks in the original coating or otherwise) on underground gas pipes so as to provide protection from corrosion.

BACKGROUND

Various utility companies typically place the appropriate utility supply line underground. This is for the convenience and safety of surrounding communities. In particular, in the natural gas industry numerous pipes extend from a supply system and extend throughout the communities to feed individual homes and businesses with a continuous supply of natural gas.

However, while placing supply lines underground protects the surrounding communities, the lines are then subjected to environmental conditions, such as moisture, temperature changes, ground shifting and otherwise, that could shorten the life of the pipe. Furthermore these pipes may be further damaged during alteration or repair of the same.

In response to these damaging conditions, the natural gas industry utilizes pipe that is precoated. Such coatings are well known in the industry of underground natural gas utilities. For example, such coatings (either commonly installed or commonly found) may include fusion bonded epoxies, extruded polyethylene, coal tar enamel, asphalt enamel and combinations thereof or the like. Preferred coatings by name include 3M™ Scotchkote™, Dupont NAP-GARD®, and ShawCor (Canusa-CPS).

However, it should be appreciated that the pipe portions or otherwise may inherently comprise of a protective coating. For example, in one aspect the protective coating may comprise of the exterior surface that has undergone oxidation. In such an occurrence, the material located below the oxidized exterior layer is at least partially protected from further oxidation.

One challenge the natural gas industry in particular encounters is the need to remove a portion of coating in order to weld a lead attachment wire. This would be necessary in order to cathodically protect the pipe. Cathodic protection is a system for preventing metal pipes from corroding. There are two types of systems for cathodic protection: 1) sacrificial anode, and 2) impressed current.

Sacrificial anodes can be attached to coated steel for corrosion protection sacrificial anodes are pieces of metal more electrically active than the steel pipe surface. Because these anodes are more active, the corrosive current will exit from the anode rather than the pipe. Thus, the pipe is protected while the attached anode is "sacrificed." Depleted anodes must be replaced for continued corrosion protection of the pipe.

An impressed current system uses a rectifier to convert alternating current to direct current. This current is sent through an insulated wire to the anodes, which are special metal bars buried in the soil near the pipe. The current then flows through the soil to the pipe, and returns to the rectifier through an insulated wire attached to the pipe. The pipe is protected because the current going to the pipe overcomes the corrosion-causing current normally flowing away from it.

Both systems require that a lead attachment be welded to the pipe surface (often called a cadmium weld or "cadweld"). This cadweld can be achieved utilizing any metal to metal connection technique such as electrical, exothermic, acetylene, brazing, soldering or screw connection). Unfortunately, once a portion of the coating is removed for a cadweld or otherwise, a holiday is formed, thereby exposing the pipe to the surrounding environment and potential corrosion.

The industry has attempted to cover these holidays by providing a rubberized patch having a small area of centralized material, for protecting the weld, surrounded by an adhesive. However, the application of a small centralized material via a protective cap may not effectively cover holidays typically formed by the cadweld, especially those holidays that extend beyond the weld. Furthermore, the surface preparation required for adhesion of the rubber patch is extensive since dirt, corrosion and uneven or non-smooth surfaces hinders the patches ability to form a seal about the cadweld or holiday. As such, these patches often require the use of motorized abrasion tools to smooth and clean the surface prior to application. This is particularly difficult if the pipe portion is located substantially below ground and only accessible through a small hole. In this situation, the repairperson may not accurately place the small patch over the weld and the attachment wire.

To make things more difficult, it is becoming more common for utility repairpersons, or the like, of natural gas companies to use keyhole technology for reaching these underground pipe portions. Prior to keyhole technology, the conventional pipe repair practice consisted of making excavations to pipe that measured at least three feet by four feet across and six or more feet deep. Keyhole technology is the accessing of underground pipe and fittings by creating small (from 12 to 18 inch diameter) holes that are substantially vertical over these pipe portions. Coring tools and vacuum excavation equipment are typically utilized in the process. Typically, these holes are small, wherein a person would not normally be able to access the underground pipes without the use of specialized tools designed for the purpose of working on a pipe or fixture from a distance of six feet or more. Because Any repairs or modification to the gas lines must be done through these keyholes, often using keyhole tools, the ability of a repairperson or the like to use common tools in preparing surfaces for patching and applying patches is severely limited.

As such, there is a need for a method, device and tools adapted for sufficiently covering and protecting members such as cadmium welds, holidays or the like from the surrounding environment conditions, even when the surface of the pipe is less then perfectly clean and/or smooth. Still further, there is a need to accomplish the above task while using keyhole technology.

SUMMARY OF THE INVENTION

In one aspect, the present invention meets the above needs by providing a patch for protecting and/or substantial sealing members such as underground pipe portions. The patch includes a fibrous material having a first side and a second side and a hydrophobic agent applied to the first or second side to form a patch, wherein upon application of the patch to a pipe portion, the pipe portion is substantially sealed, or otherwise coated with a anti-corrosion agent, from the surrounding environment.

In another aspect, the present invention meets the above needs by providing a method of protecting and/or sealing members, such as a pipe portion, from corrosion. In one aspect, the method including the steps of: a) providing a pipe portion having a coating with at least one discontinuity therein, such as a cadmium weld, holiday or otherwise; b) providing a patch having fibrous material and an hydrophobic material; and c) applying the patch onto the discontinuity, wherein the pipe portion residing in the area of the discontinuity is substantially sealed, or otherwise coated with an anti-corrosion agent, from the surrounding environment.

In another aspect, the present invention meets the above needs by providing one or more tools for the application of a patch to a member, such as a pipe portion, and is particularly adapted to be used within a keyhole. The device comprises an elongated member having a first end and a second end. The first end includes a handle portion, or an attachment therefor, and the second end includes an attachment member, wherein the attachment member is adapted to matingly engage a patch having an anti-corrosion agent. The device further includes an applicator attached to the second end of the elongated member. The applicator is adapted to form about a portion of a cylindrical member. As such, upon placement of the applicator about a cylindrical member the patch is substantially wrapped about and pressed against the cylindrical member and upon removal of the applicator the attachment member disengages the patch thereby leaving the patch substantially wrapped about the cylindrical member and substantially sealing the same from moisture from the surrounding environment and/or coating the same with an anti-corrosion agent.

DETAILED DESCRIPTION OF THE PREFERRED EMBODIMENTS

The present invention provides a method, device and tool for the protection and/or sealing of members exposed to environmental or manmade conditions that reduce or otherwise degrade the structural integrity of the member. More particularly, the present invention provides corrosion protection to a member, such as a pipe portion and particularly to pipe portions located underground. Furthermore, the present invention allows for the substantial sealing of holidays or other types of voids formed in a protective coating of a pipe portion. Still further, the present provides all of the above benefits and is further adapted to be applied within a keyhole formed in the ground or otherwise. Other advantageous should be appreciated both implicitly and explicitly.

In general, the present invention provides a protective patch adapted to provide substantial sealing and/or corrosion protection for a member such as a pipe portion, or otherwise, in which it is applied to. The patch includes an agent on one or both sides of the patch, which is conducive to corrosion protection of metal parts. The size and shape of the patch may vary depending on the size and shape of the application. Optionally, the patch may be installed on the pipe portion utilizing a tool adapted to be used within a keyhole formed in the ground.

In a first aspect, the present invention provides a patch. The size and the shape of the patch may vary depending on the application. Suitable shapes include geometric and non-geometric shapes. Geometric shapes may be selected from circular, triangular, square, rectangular, pentagonal, hexagonal, heptagonal, octagonal, etc., or otherwise. In any of the shapes of the patch, the patch is suitable in size to be wrapped about a portion of a pipe. Furthermore it is contemplates the size of the patch is such that it can be wrapped about one half of a pipe portion. More so, it is contemplated that the patch may be sized such that it can be wrapped about the entire circumference of the pipe portions.

The size of the patch may vary depending on the application. Suitable patch sizes includes the width, length and diameter dimensions comprising 4, 5, 6, 7, 8, 9 10, 11, 12, 24 or more inches, wherein the width and length may or may not be the same. Most preferred dimension includes 4×4 inches, 6×6 inches, 8×8 inches and 12×12 inches.

However, it should be appreciated that the present invention may be used in application other than cylindrical members. For example, the patch may be used on tanks, walls or other large structural or nonstructural objects to substantially seal the same from the surrounding environment. It should be appreciate that any of the application contained herein may be performed in considerably damp conditions or even underwater due to the characteristics of the hydrophobic agent or with the use of other attachment members as discussed herein or otherwise. One particular application may be in the use of patching cracks located on basement walls. As such, it is contemplated that the size of the patch may be substantially larger including maximum dimensions of 2, 4, 6, 10, 12 feet or more.

The thickness of the patch may also vary depending on the application. Preferably the thickness of the patch is consistent along the width, length or diameter of the patch. A preferred thickness is between about 1/32 to 1/4 inches. A more preferred thickness is about 1/8 inch. However, it is foreseeable that the patch may have variable thickness. For example, the patch may be contoured to be formed about a cylindrical pipe portion or the like without out substantial flexing of the patch. As such, it is foreseeable that the patch includes a radius on at least one side, whereby the outer portion of the length, width or diameter is thicker than the center portion. In this regards, the thickness of the patch may be between ½ to 4 inches or more.

Figure 1:
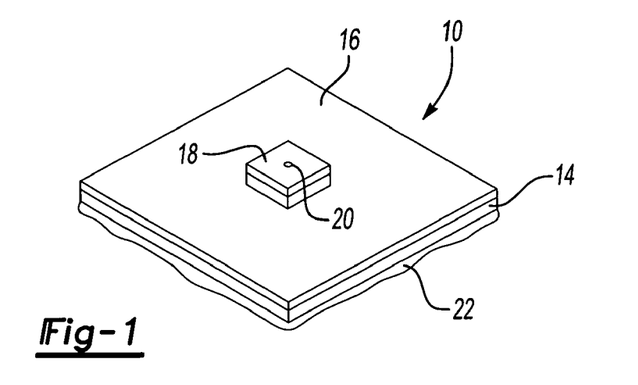
FIG. 1 illustrates a perspective view of one embodiment of a patch of the present invention.
Figures 2, 3:
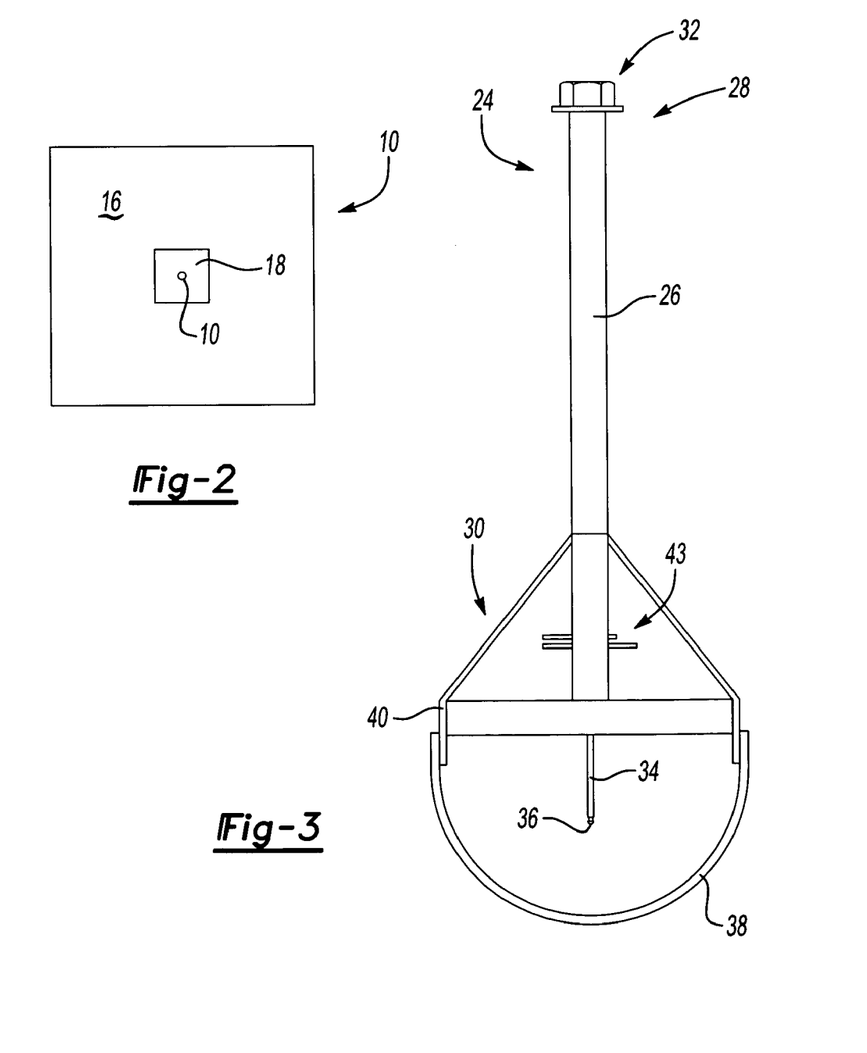
FIG. 2 is a top view of FIG. 1.
FIG. 3 illustrates one embodiment of a tool of the present invention adapted for the application of a patch to a pipe portion.

Referring to FIGS. 1 and 2, one embodiment of the patch 10 of the present invention is illustrated. The patch may comprise of any number of materials; however, a preferred material comprises a fibrous material 14 having a first side and a second side. Typically, the fibrous material includes pours, open cells, paths or the like, which allows for agents, as described herein or otherwise, to enter at least a portion of the patch. Furthermore, in one embodiment, the fibrous material is adapted to be substantially saturated with an agent or otherwise.

In a preferred embodiment, the patch comprises a flexible member adapted to be wrapped about a cylindrical portion, e.g., a pipe. Preferably, the flexible member is also resilient such that it is adapted to return to its original shape. However, it is foreseeable that the patch may alternatively comprise of a rigid or semi-rigid material. Furthermore, it is contemplated that the patch may comprise of a malleable material such that it may formed or preformed for a specific application. It should be appreciated that any preformed patch may still be flexible and/or resilient. For example, a preformed patch may comprise of a sponge or foam material which has a corresponding shape to the member it is being applied to. Suitable members may include pipe portions, valve members, or other components associated with utility pipe systems.

The patch of the present invention may comprise woven or non-woven material. Suitable woven materials include textiles (e.g., cloth, fleece, fabric, lace, netting, or the like), which may or may not comprise a pattern. In contrast, suitable non-woven materials include felt, sponges, foam, fibrous wadding, the like, combinations thereof, or any other material that may be assembled together in a non-woven configuration and is preferably adapted to be at least partially saturated by an agent.

With respect to suitable materials, the patch may comprise any number of materials, which includes both synthetic and non-synthetic material, and which may or may not be woven. Examples of suitable synthetic materials include polyester, polymer, polypropylene, polyethylene, the like or combinations thereof. Examples of suitable non-synthetic materials include cotton, wool, leather, suede, silk, fur, hair, husk, stalks or otherwise.

However, in a most preferred embodiment, patch material comprises a felt material, which is adapted for at least partial saturation and is also flexible. A specific felt material is offered by Foss Manufacturing Company Inc. under the trade name Fossorb™.

Advantageously, the patch may further include a backing 16. Advantageously, the backing may provide support for the fibrous material 14. As such, it is contemplated that the fibrous material is attached, mounted or otherwise joined with a backing. It should be appreciated that as with the fibrous material, the backing may also comprise a flexible, rigid or semi-rigid material, which may or may not be different then that of the fibrous material. However, in a preferred embodiment, the backing comprises a flexible material and preferably has a corresponding shape to that of the patch.

Figure 7:
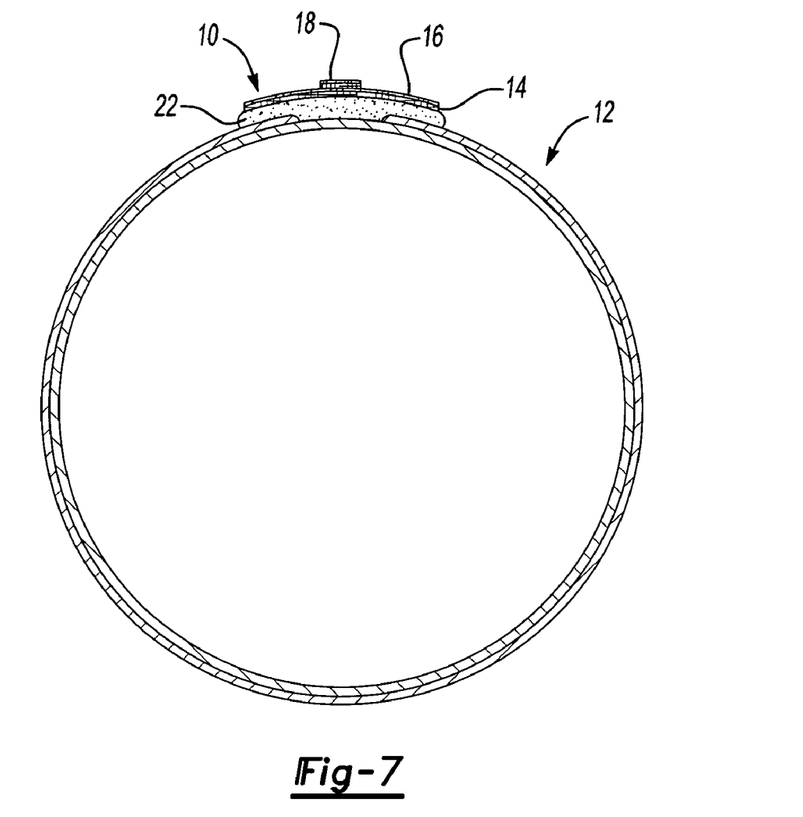
FIG. 7 is a cross-section view of a pipe portion and one embodiment of the patch of the present invention.

The backing may comprise of numerous types of material. As with the patch, the material of the backing may be synthetic or natural, and may be woven. Suitable backing materials include plastic, rubber, metal or combinations thereof. However, a preferred material is substantially non-permeable to air and/or liquid. As such, referring to FIGS. 7 and 8, with substantial saturation of the agent into the patch, which extends to the backing, the entire patch is adapted to substantially seal the pipe portion, or otherwise, from the surrounding environment. However, it should be appreciated that it is not necessary for there to be substantial saturation of the fibrous material in order to substantially seal the portion of the pipe in which the patch is applied to.

In a most preferred embodiment, the patch further includes an attachment member 18 adapted to matingly engage with a corresponding member, such as a keyhole tool. Preferably, the attachment member is located on the backing and includes an engaging feature 20 for temporary attachment to the corresponding part. It should be appreciated that numerous engaging features may be used for the temporary attachment. Suitable engaging features include: friction fit, hook and latch, adhesives, suction fit, snap fit, threads, other mechanical type fastener, otherwise or combinations thereof. However, it should be appreciated that the attachment member may comprise solely of an adhesive located on the fibrous material or backing and is adapted for engagement with a keyhole tool or otherwise.

In another preferred embodiment, it should be appreciated that the fibrous material comprises a portion of an attachment feature adapted to engage a corresponding member. For example, the fibrous material may comprise a portion of a hook and latch configuration, wherein a keyhole tool is configured with the corresponding hook and latch feature. As such, it is contemplated that the patch may be applied to a pipe portion or otherwise using the fibrous material and a hydrophobic agent only.

The present invention further contemplates the application of an agent 22 to the patch 10. Advantageously, the agent comprises a hydrophobic material adapted to seal or otherwise prevent water, moisture or the like from penetrating therethrough to the member it is applied to. An example of a hydrophobic material includes anti-corrosion agents.

In a preferred application, prior to application of the patch to a member, the agent is applied to the patch to cover a substantial portion of one or two sides thereof. In a most preferred embodiment, the agent is applied to one side of the patch, opposite of the backing. Preferably, the agent enters the pores, cell openings or otherwise saturates at least a portion of the fibrous material. However, it is contemplated that in one embodiment the agent may substantially saturate the fibrous material.

It should be appreciated that along with the saturation or application of agent onto the patch portion, a layer of agent may be formed that extends away from the surface of the patch. This may be particularly illustrated in FIGS. 7 and 8. This additional layer is most advantageously used to coat and/or cover voids, pockets, depression or the like of unsmooth members such as holidays in pipe portion coatings. As such, it ensures the all of the material located on the pipe portion is coated with the agent and preferably sealed from the surrounding environment. Preferably, the additional layer is approximately $\frac{1}{16}$-1 inch thick. More preferably, the additional layer is between about $\frac{1}{4}$-$\frac{3}{4}$ inch. The thickness of the additional layer may or may not be consistent through the width, length or diameter of the patch. For example, it should be appreciated that the additional layer may be applied by hand during installation of the patch, wherein the layer will likely have a variable thickness. Alternatively, the layer may be applied to the patch at a facility or otherwise, thereby allowing for a more uniform thickness.

Numerous hydrophobic materials are available and may be used as the agent of the present invention. Preferably, the agent is adapted to displace water from a pipe portion and form a substantial seal between the pipe portion and the surrounding environment or both. A most preferred material has a material viscosity such that is adheres to the patch, pipe portion or otherwise. As such, a preferred material can be applied to the patch without substantial running or dripping of the material off of the patch or pipe portion.

While the agent of the present invention is hydrophobic, a preferred agent comprises or otherwise includes petroleum or a petroleum byproduct. Suitable generic petroleum products include oils, grease or other lubrication type products. A most preferred agent is petroleum, wax-based product sold by Trenton Corporation of Ann Arbor, Mich. under the trade names Graycoat, Temcoat, Temcoat 3000 and Wax-Tape Primer.

It should be appreciated that the agent may include additives to improve performance with respect to viscosity, hydrophobic characteristics or otherwise. One preferred additive includes a wax. Advantages derivable from the use of waxes include increase viscosity and adhesion characteristics. In a preferred embodiment the additive include petroleum waxes and oils.

Optionally, the patch may be further configured with a member attachment feature for assisting in the securing of the patch to a member. Suitable additional attachment features includes adhesives, epoxy, wax, tapes, bands, shrink-wrap or otherwise. For example, in one configuration, the additional attachment feature may comprise a member having adhesive characteristics extending away from the patch. As the patch is applied to the member the central portion of the patch coats and substantially seals that portion of the member while the outer extents of the patch is bonded to the member with the additional attachment feature. In another example, bands, tape or shrink-wrap may be wrapped or otherwise placed about a patch and member for securing the patch to the member. In yet another example, a wax, epoxy, adhesive or otherwise may be poured over the patch and member thereby securing the patch to the member.

In another aspect of the present invention, a tool 24 is provided for the application of a patch or other protective material and any associated agent to a pipe portion 12. The tool is particularly adapted to be used with keyhole technology, wherein the tool is adapted to be place and extended down into a substantially vertical hole or the like. As previously mentioned, typically a keyhole is relatively small. For example, a keyhole may be formed having a diameter of 36 inches or less. More commonly, the keyhole has a diameter of 18 inches or less. Still further, the keyhole may comprise a diameter of 12 inches or less.

Figure 4:
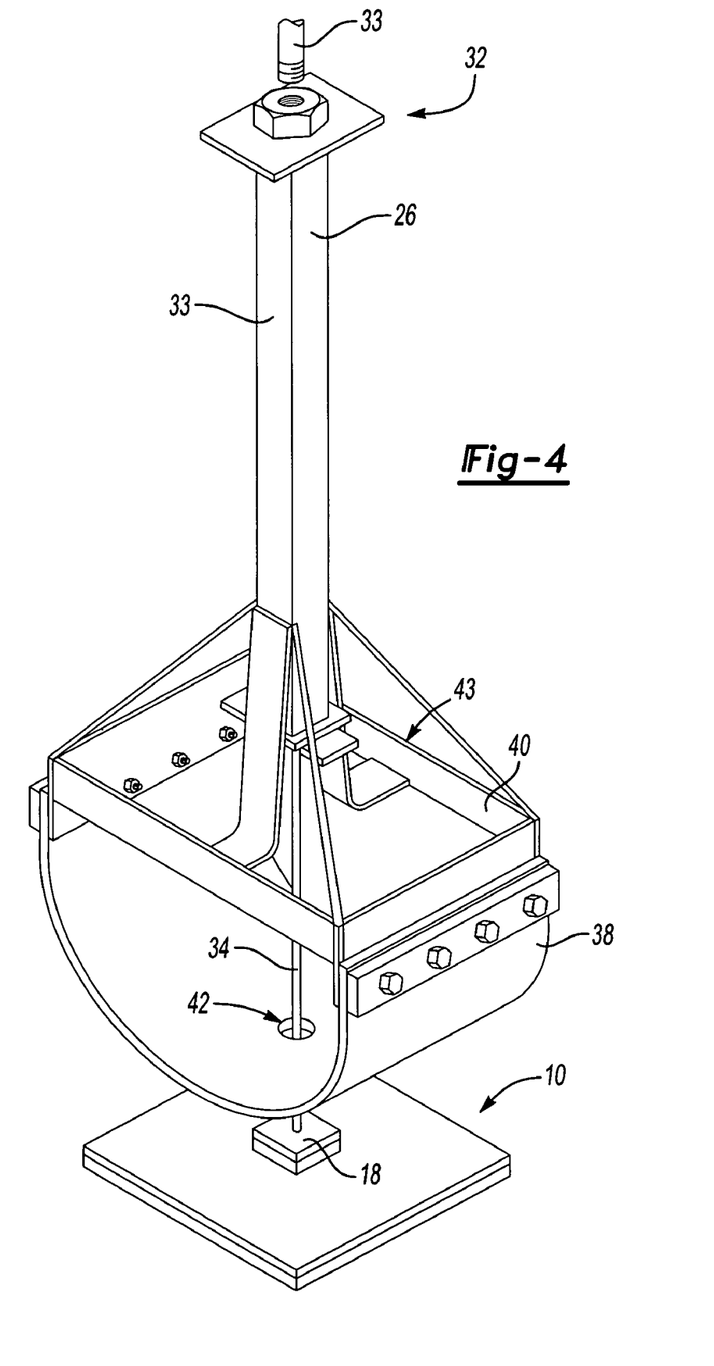
FIG. 4 is a perspective view of the tool shown in FIG. 3.
Figures 5, 6A:
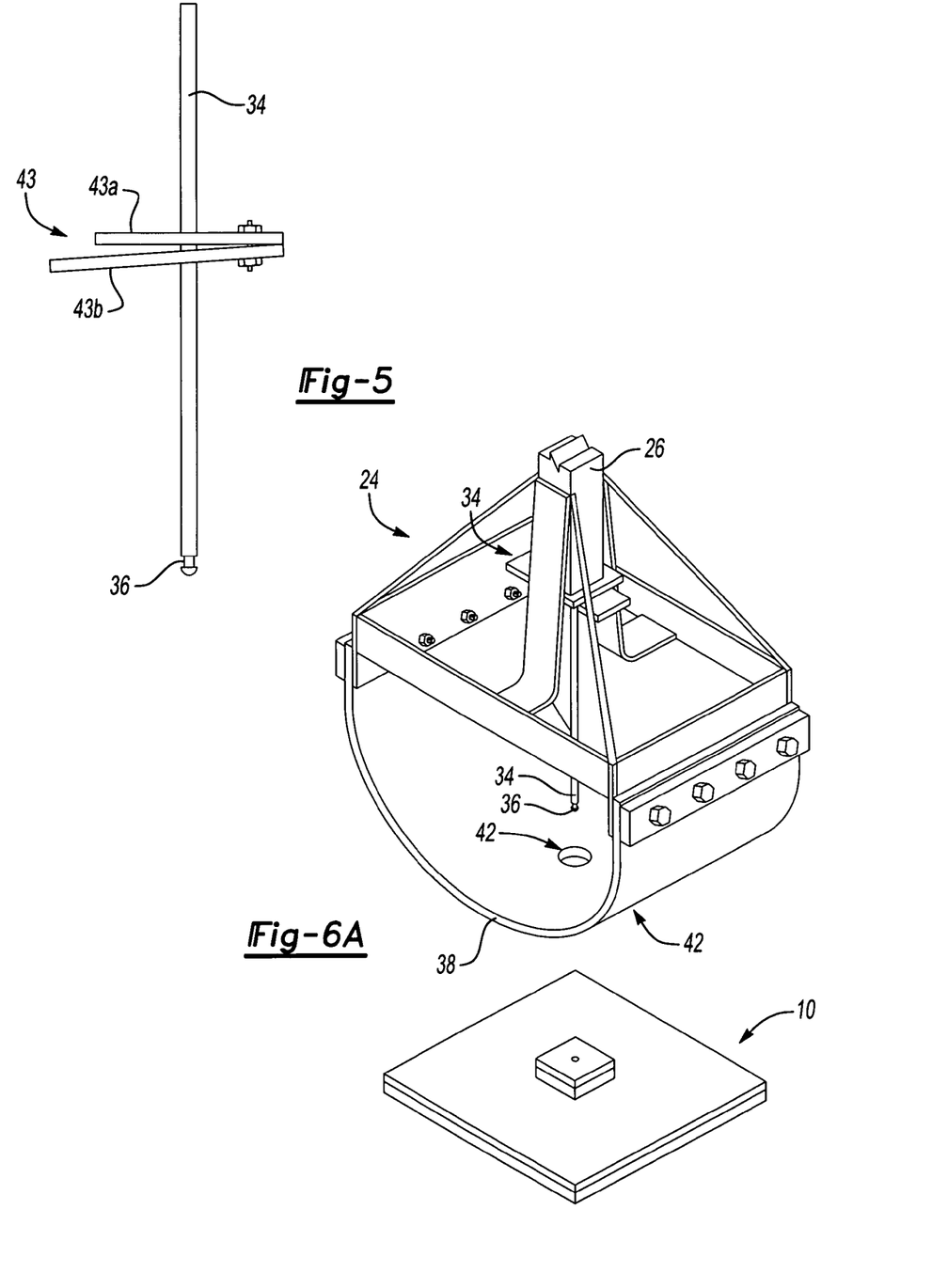
FIG. 5 illustrates an enlarged view of a release mechanism of the tool shown in FIG. 3.
FIGS. 6A-I illustrates a patch being applied to a pipe portion using the tool shown in FIGS. 3-5 according to one preferred method of the present invention.

Referring to FIGS. 3-5, one embodiment of a tool is illustrated. The tool includes an elongated member 26 having a first end 28 and a second end 30. Preferably, the elongated member comprises a shaft, having a round or square cross section, extending along an axis. Located proximate to the first end, the elongated member includes a connection 32 for a handle portion 33. In one preferred embodiment, the connection comprises a threaded feature adapted to engage a handle portion. However, it should be appreciated that the handle portion may comprise a portion of the elongated member or comprise a separate component attached to the elongated member. Either way, the handle portion is adapted to assist in lowering the tool into a keyhole.

Located proximate to the second end, the tool includes an attachment member 34, also preferably extending along the axis. Preferably, the attachment member is slidably attached to the second end of the elongated member. The attachment member includes an attachment feature 36 adapted to engage a patch as described herein. It should be appreciated that numerous types of attachment features may be used to attach the patch 10 to the attachment member 34. Suitable attachment features includes: friction fit, hook and latch, adhesives or otherwise.

Also located proximate to the second end, the elongated member further includes an applicator 38 adapted to apply the patch onto a cylindrical portion such as a pipe 12. Preferably, the applicator is adapted to press fit the patch to the cylindrical portion. In a preferred embodiment, the applicator is a flexible member so as to form about a cylindrical member.

The application of pressure by the applicator against the patch assists in pressing the patch against a pipe portion. However, it also assists in separating the patch from the tool by pushing the patch away from an attachment feature, located on the tool, during removal of the applicator from the pipe portion. This may be best demonstrated in FIG. 6G. As such, in a preferred embodiment, the applicator comprises a resilient member so as to provide continuous pressure against the patch during application and return of the tool to an original position.

Figure 8:
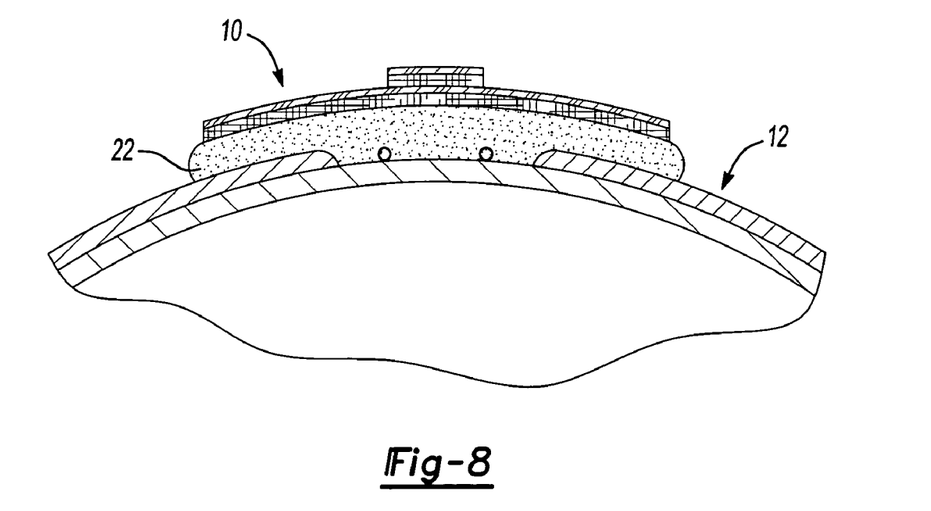
FIG. 8 is an enlarged view of FIG. 7.

The applicator is adapted to apply a generally even distribution of force against the patch portion such that any layer of agent located between the fibrous material and the pipe portion, or otherwise, has a generally consistent thickness as demonstrated in FIG. 8.

In one preferred embodiment, the applicator includes a frame portion 40 to attach the applicator to the second end of the elongated member. However, it is contemplated that the applicator may be mounted on other portions of the tool member.

Referring back to the attachment member 34, the member is adjustable along the axis. Preferably, the adjustability of the attachment member allows for one-direction free movement. For example, the attachment member may be pushed in one direction, preferably into a retracted position or towards the handle, with little resistance. In contrast, applying a force in the opposite direction results in a resistance in movement. As such, in one preferred embodiment the attachment member is adapted for one directional free movement only. However, it should be appreciated that the attachment feature includes a release mechanism 43 or the like for allowing for the return of the attachment feature to its original position, e.g., extended away from the second end of the elongated member. This retraction works in conjunction with the applicator 38 to apply the patch evenly to a pipe portion as discussed in more detail below in the operation of the present invention.

Referring to FIG. 5, a preferred release mechanism is illustrated having a first and second release member 43a, 43b adapted to allow for the free axial movement of the attachment member in one direction, i.e. towards the handle portion, and create a binding relationship with the attachment member in an opposite direction, i.e. away from the handle. In this configuration, the attachment member extends through at least a portion of the release mechanism.

Preferably, the attachment feature 36 extends beyond the applicator 38. As such, in one embodiment, the applicator includes an opening 42 for allowing the attachment member 34 to extend therethrough. This may be best demonstrated in FIG. 4.

Figures 6B, 6C:
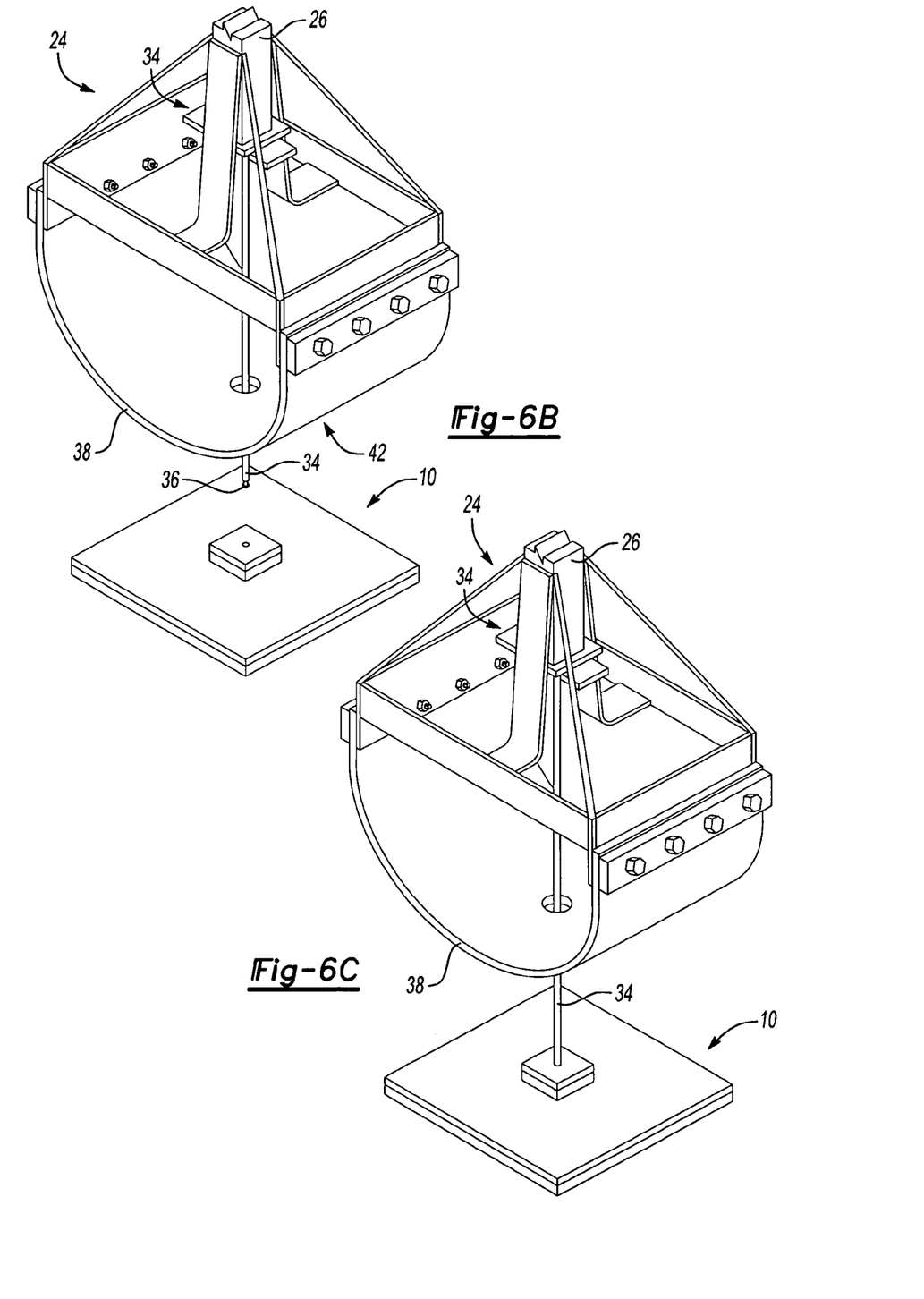

Referring to FIGS. 6A-I, different stages in the application of the patch 10 to a pipe portion 12 using tool 24 are illustrated according to one embodiment of the present invention. At the onset, referring to FIGS. 6A-B, the attachment member 34 is extended through the opening 42 of the applicator 38 so that the attachment feature 36 is located external to the applicator. Referring to FIG. 6C, the attachment feature of the patch and attachment member are joined together to fixedly attach the patch to the tool. Preferably, at some time prior to placement of the tool into a keyhole, an agent is placed on the patch as described herein.

Figure 6D:
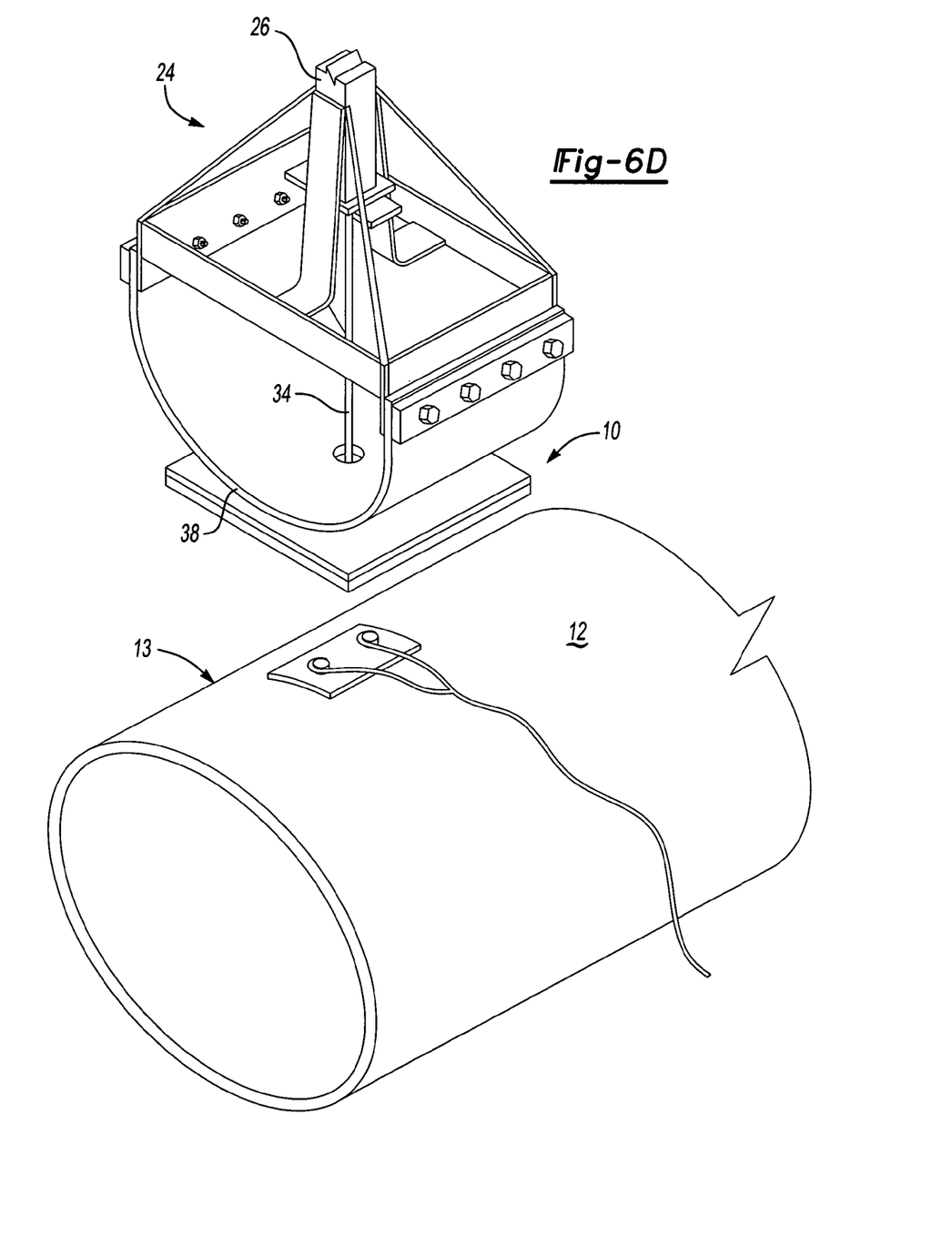
Figure 6E:
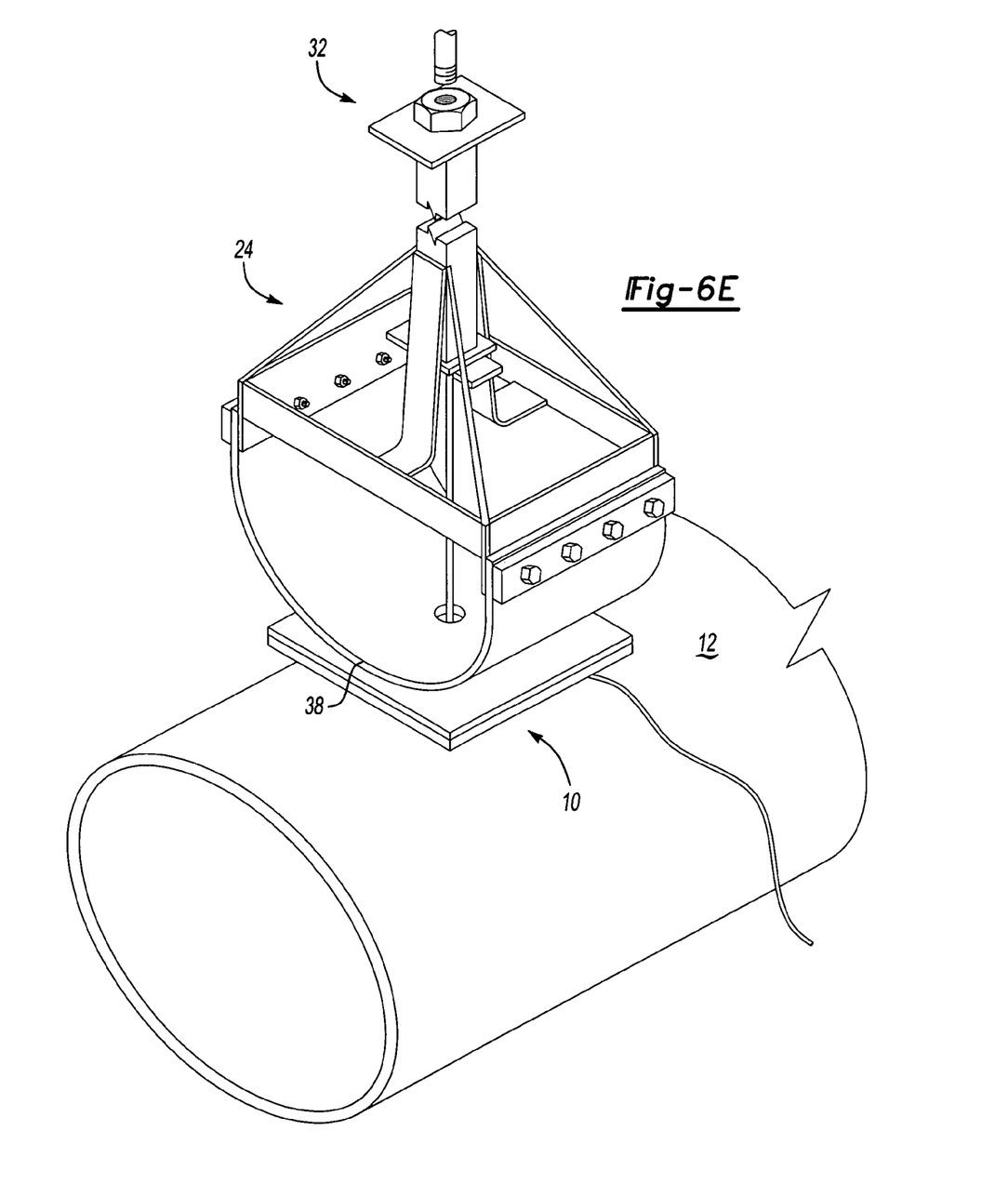
Figure 6F:
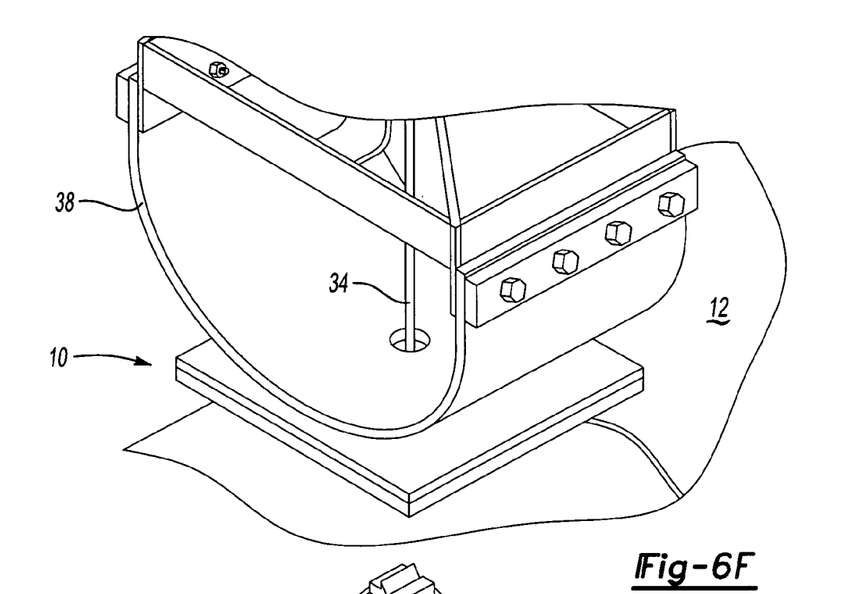

Referring to FIGS. 6D-E, using the handle portion of the elongated member, the tool is lowered or otherwise placed over a pipe portion. Furthermore, the patch is placed over a cadmium weld 13, holiday or otherwise 44. Advantageously, the pipe portion is located within a keyhole formed in the ground. Referring to FIGS. 4 and 6F, one embodiment of the applicator is shown just prior to the application of the patch to a pipe portion.

Figure 6G:
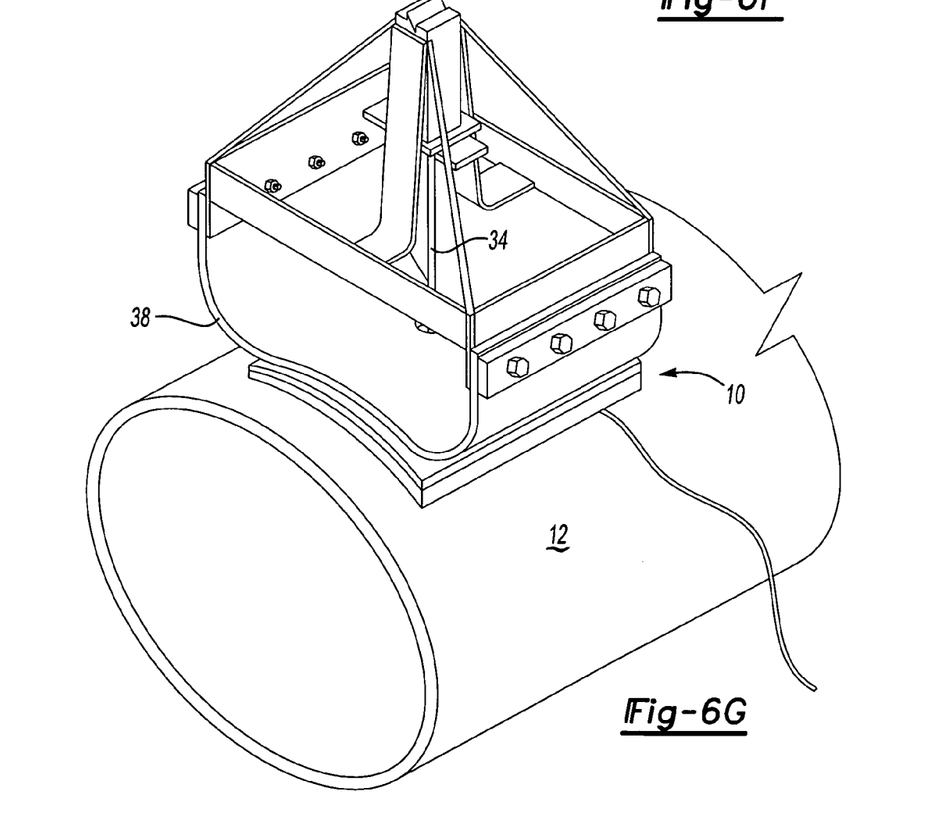

With the applicator placed proximate to a cadmium weld, holiday or otherwise, the tool is moved towards the pipe portion, pressing the patch against the pipe portion. It should be appreciated that the applicator may be applying pressure against the patch, and thus the pipe portion, due to the resilient characteristics of the applicator in a preferred embodiment. During movement of the tool towards the pipe portion, the attachment member retracts towards the handle portion; however, preferably, the attachment feature of the patch and attachment member remain joined. Preferably, movement of the tool towards the pipe portion is completed upon the applicator forming about a portion of the pipe. Referring to FIG. 6G, one embodiment of the applicator is shown after substantially applying the patch about a pipe portion. Preferably, the application of pressure against the patch results in the patch being smoothly applied to the pipe portion. More preferably, a layer of agent having a generally consistent thickness is located between the pipe portion and the fibrous material. Still more preferably, the agent and optionally the patch is substantially absent of voids where no agent exists.

Figure 6H:
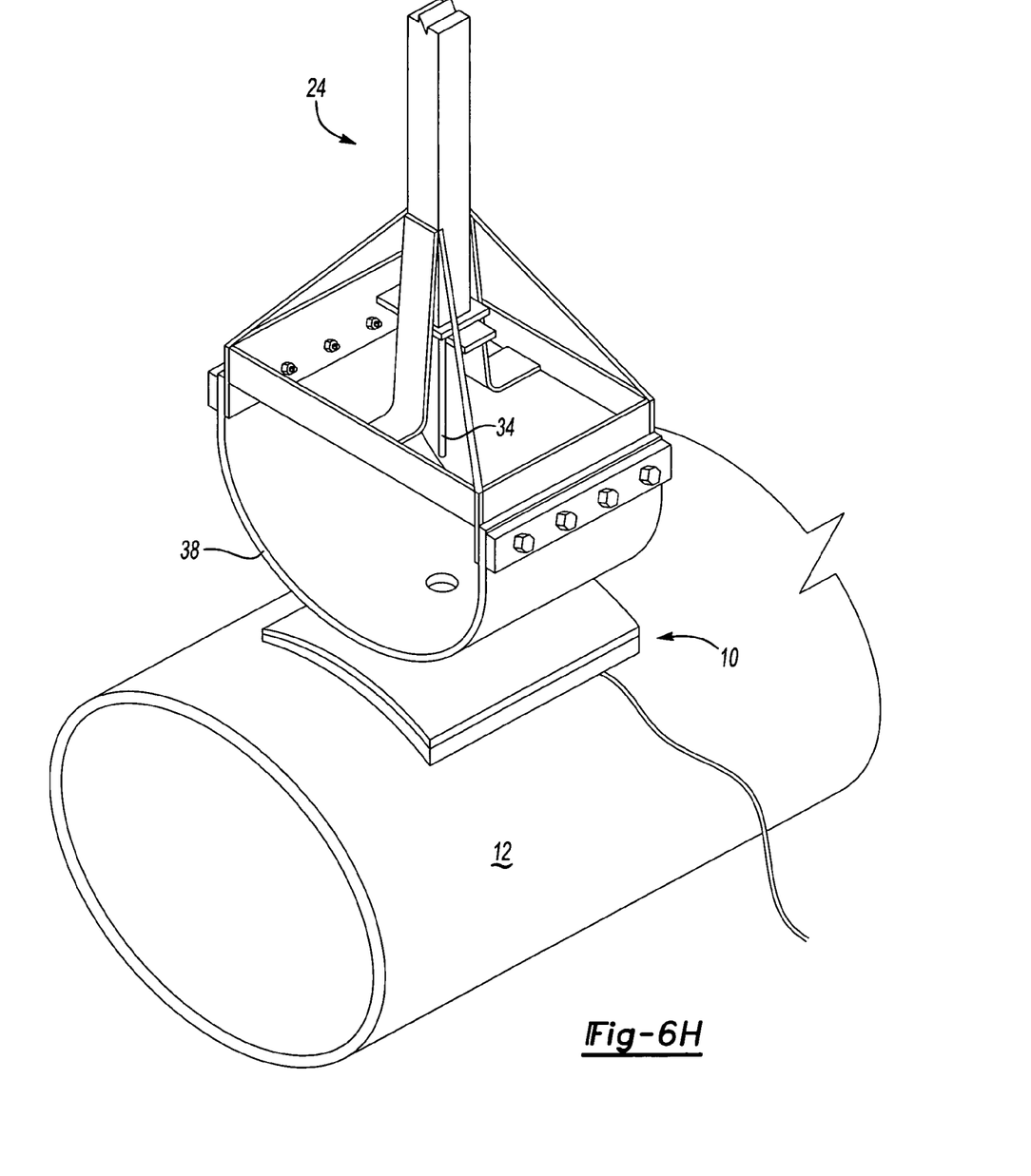
Figure 6I:
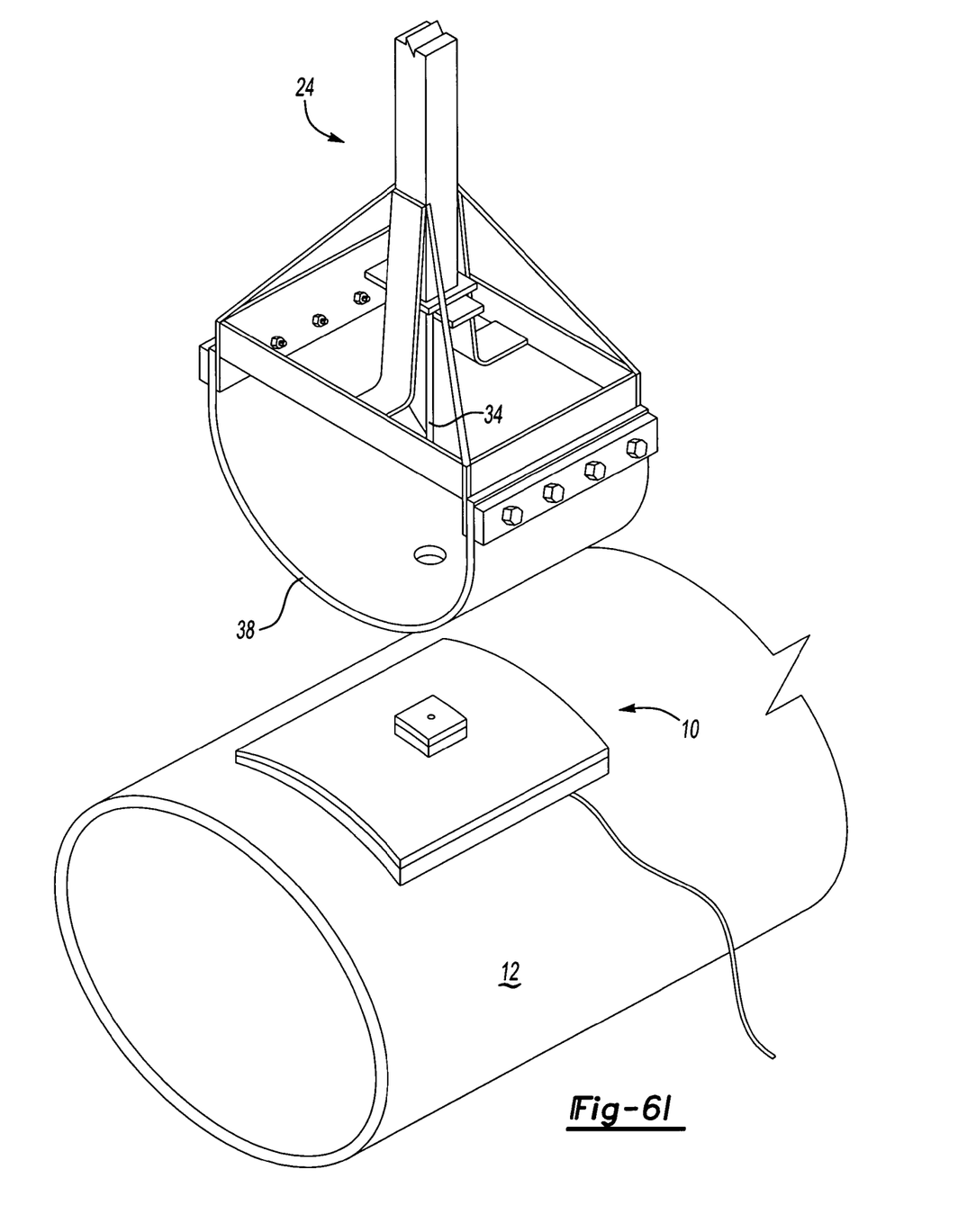

Preferably using the handle portion, the elongated member is then moved away from the pipe portion. Referring to FIGS. 6H-I, as the elongated member is moved away, the attachment features of the pipe portion and the attachment member disengage. This is due to the one-way free movement of the attachment member, i.e., as the elongated member is moved away from the pipe portion so does the attachment member, while the applicator maintains pressure against the patch to pipe portion due to its resilient characteristics. Eventually, as the elongated member moves further away from the pipe portion the applicator returns to its original position and disengages with the patch leaving the patch firmly placed against the pipe portion with any cadmium weld, holiday or otherwise covered and preferably substantially sealed from the surrounding environment. Due to the viscosity or other characteristics of the agent, the patch maintain its position on the pipe portion relative to the cadmium weld, holiday or otherwise. It should be appreciated that other tools may be used to assist in the application of the patch to a pipe portion. For example, referring to FIGS. 9 and 10, two additional tools are shown that are particularly useful in smoothing a patch to a pipe portion for assuring that a substantial seal is created between the pipe portion and the surrounding environment.

Figures 9, 10:
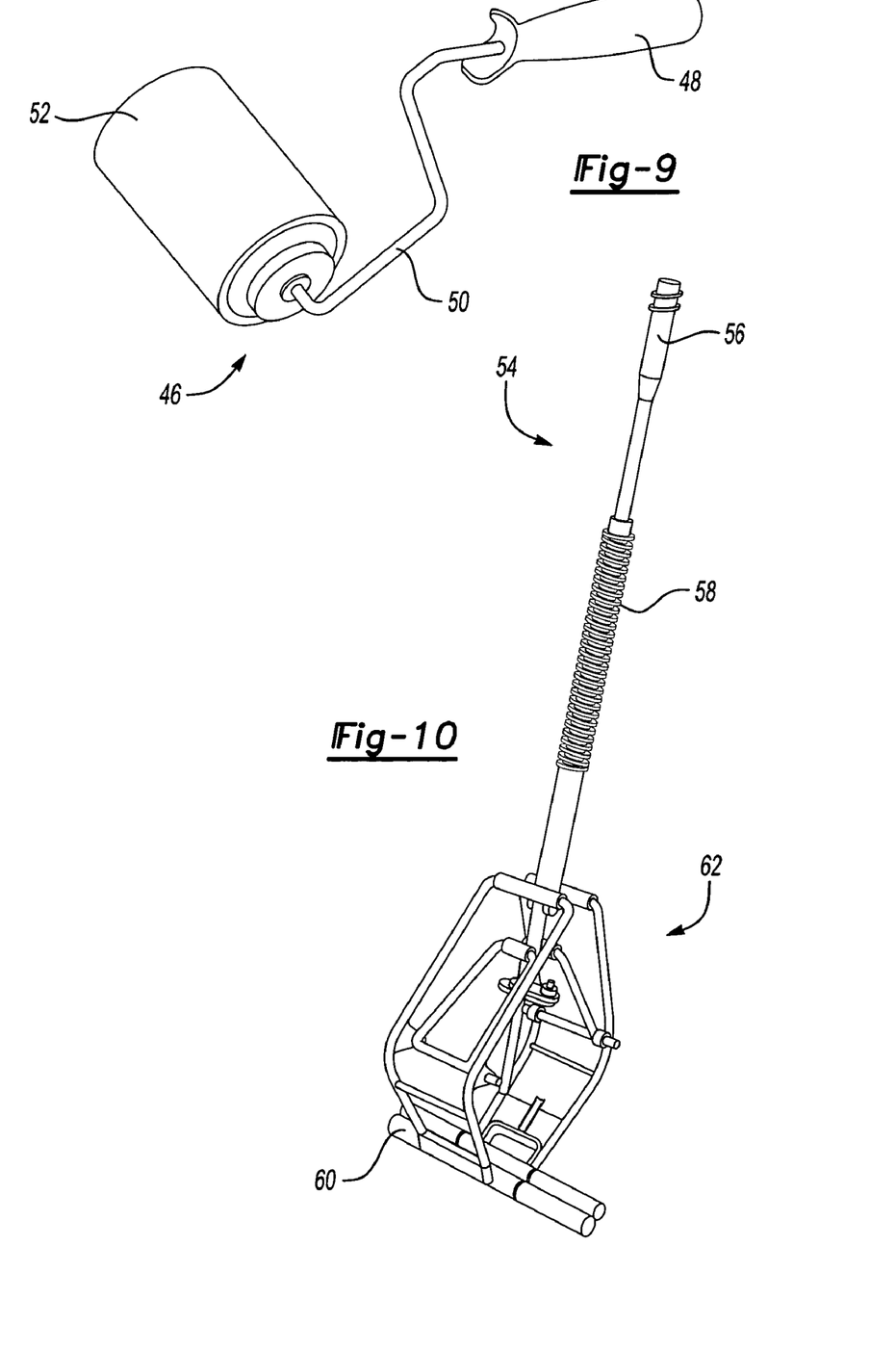
FIG. 9 illustrates another tool adapted for use in the application of a patch to a pipe portion.
FIG. 10 illustrates yet another tool adapted for use in the application of a patch to a pipe portion.

Referring to FIG. 9, a first additional tool 46 is illustrated. The tool is configured with a handle portion 48, an extension 50 and an applicator 52. Preferably the applicator is rotatably mounted to the extension such that the applicator is free to roll over a patch and/or pipe portion. In a most preferred embodiment of the first additional tool, the applicator comprises generally of a roller. More preferably, the roller is smooth or semi-smooth about the exterior surface. It should be appreciated that the extension can be configured of any length and preferably a length adapted to be used within a keyhole formed in the ground or otherwise as described herein.

In application, the first additional tool 46 is extended within a keyhole exposing a pipe portion having a patch formed over a portion thereof. The applicator is rolled over the patch, thereby ensuring that a substantial seal is formed between the covered pipe portion and the surrounding environment. Preferably, the smoothing of the patch is performed without substantial entrance of the user into the keyhole.

Referring to FIG. 10, a second additional tool 54 is illustrated. The second additional tool includes a handle portion 56, an extension 58 and an applicator 60. In the embodiment illustrated, the applicator is configured with two rollers pivotally mounted and located proximate to one another. The rollers are adapted to roll over a patch or pipe portion. As such, the applicator is adapted to assist placing the patch about the pipe portion so that a substantial seal is formed between the pipe portion and the surrounding environment. It should be appreciated that the applicator is configured with mechanism 62 for rotational movement of the rollers and separation of the roller. This is particularly advantageous during forming about a pipe portion.

In application, the second additional tool is lowered into a keyhole exposing a pipe portion having a patch formed over a portion thereof. The rollers of the applicator are separated and rolled over a patch and/or pipe portion, thereby ensuring that a substantial seal is formed between the covered pipe portion and the surrounding environment. Preferably, the smoothing of the patch is performed without substantial entrance of the user into the keyhole.

It should be appreciated that the additional tools illustrated in FIGS. 9 and 10 are particularly useful in the application of patches to side portions of a pipe, e.g., portion of the pipe that are located in areas other than the center of a keyhole.

In yet another aspect, the present invention provides a method of protecting underground pipe portion from damage. In one embodiment, the method may includes the steps as described below.

Providing a pipe, the pipe preferably having a portion exposed to the surrounding conditions such as a holiday (e.g., a discontinuity, omission or the like) formed in a coating of the pipe, a cadmium weld formed on the pipe or otherwise. It should be appreciated that the coating is configured to protect the pipe from corrosion resulting from surrounding conditions, particularly of underground pipes. A patch is provided for covering the exposed pipe portion, wherein the patch is a patch as described herein (e.g., the patch comprises a fibrous material and an hydrophobic material located on at least on side). The patch is applied onto an exposed pipe portion, preferably, the exposed pipe portion is substantially sealed from the surrounding environment.

Optionally, the method may further include using one or more tools in the application of the patch to the exposed portion of a pipe. It should be appreciated that a first tool may be used to apply the patch to a pipe portion. Also, additional tools may be used for further place or position the patch smoothly against the pipe portion such that the pipe portion is substantially sealed from the surrounding environment.

Additionally, the method may further include the step securing the patch to the member using the member attachment feature.

Though preferred embodiments of the present invention have been described, other embodiments are within the scope of the present invention. For example, the patch may include a material that is non-fibrous such as rubber, metal, plastic or the like. Similarly, the patch may omit the fibrous material and apply the hydrophobic agent directly to the backing. Other similar variants are within the scope of the present invention.

Also, the present invention also contemplates the formation of a kit for the protection of member such as pipe portion. Advantageously the kit may include any of the features contained herein. One example of a preferred kit includes a patch as described herein, including a hydrophobic agent, and a tool for the application of the patch to a pipe portion.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only three of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of protecting a pipe portion from corrosion, the method including the steps of:
    a) providing a pipe portion having a coating with at least one discontinuity therein;
    b) providing a patch having fibrous material and a hydrophobic agent, the fibrous material including pores in which the hydrophobic material enters, the hydrophobic agent including a petroleum product; and
    c) applying the patch onto the discontinuity, wherein the pipe portion residing in the area of the discontinuity is substantially sealed from the surrounding environment.

2. The method of claim 1, further including the step of attaching the patch to a keyhole device.

3. The method of claim 2, wherein attachment of the patch to the keyhole device comprises a friction fit.

4. The method of claim 1, wherein the discontinuity includes a cadmium or exothermic weld.

5. The method of claim 1, further comprising the step of forming a substantially vertical keyhole in a ground surface to expose the pipe portion.

6. The method of claim 5, wherein the keyhole has a diameter of about 36 inches or less.

7. The method of claim 5, further comprising the step of applying the hydrophobic material onto the patch at the location of the keyhole.

8. The method of claim 5, further comprising the step of applying the hydrophobic material onto the patch at a manufacturing facility of the patch.

9. The method of claim 2, wherein the patch is temporarily attached to the keyhole device through an engagement feature.

10. The method of claim 9, wherein the engagement feature comprises a hook and latch or a friction fit feature.

11. The method of claim 2, wherein the discontinuity comprises a holiday formed in a coating of the pipe portion.

12. The method of claim 2, further comprising the step of smoothing the patch over the pipe portion.

13. A method of forming a protective layer over an underground pipe, the method including the steps of:
    a) forming a substantially vertical keyhole in a ground surface to expose a pipe portion, the keyhole having a diameter of about 36 inches or less;
    b) providing a patch having a first side comprising a fibrous material and a second side including an attachment feature;
    c) applying anticorrosion agent to the first side of the patch to form a layer thickness between about $\frac{1}{16}$ to 1 inch;
    d) attaching the second side of the patch to a tool with the attachment feature, the tool being adapted for placement within a keyhole;
    e) lowering the patch within the keyhole such that the first side is proximate to a holiday formed in the coating of the pipe portion;
    f) applying and smoothing the patch over the pipe portion to seal the holiday from the surrounding environment.

14. A method of protecting a pipe portion, the method including the steps of:
    a) providing a pipe portion having a coating with at least one discontinuity therein;
    b) providing a patch including an open cell fibrous material;
    c) applying a hydrophobic material to the patch to cause at least a portion of the fibrous material to become saturated by the hydrophobic material; and
    d) applying the patch onto the discontinuity, wherein the pipe portion residing in the area of the discontinuity is substantially sealed from the surrounding environment.

15. The method of claim 14, further comprising the step of forming a substantially vertical keyhole in a ground surface to expose the pipe portion, wherein the keyhole has a diameter of about 36 inches or less.

16. The method of claim 15, further including the step of temporarily attaching the patch to a keyhole device through an engagement feature, wherein the keyhole device is used to apply the patch to the pipe portion.

17. The method of claim 16, wherein the step of temporarily attaching the patch to the keyhole device includes engagement of corresponding engagement features located on the keyhole device and on a backing portion of the patch.

18. The method of claim 14, wherein the hydrophobic material includes a petroleum product that is applied to the patch at a location of the keyhole, at a manufacture facility of the patch, or both.

19. The method of claim 18, wherein during application of the hydrophobic material to the patch includes forming a layer of hydrophobic material having a thickness of approximately $\frac{1}{16}$ to 1 inch thick.

20. The method of claim 18, wherein during application of the hydrophobic material to the patch, the fibrous material becomes substantially saturated with the hydrophobic material.

21. The method of claim 18, wherein the hydrophobic material further includes wax or a wax-based product.

22. The method of claim 14, further comprising the step of securing the patch to the pipe portion with an attachment feature.

23. The method of claim 22, wherein the attachment feature comprises adhesive, epoxy, wax, tapes, bands or shrink-wrap.

24. The method of claim 2, wherein the step of attaching the patch to the keyhole device includes engagement of corresponding engagement features located on the keyhole device and on a backing portion of the patch.

25. The method of claim 1, wherein the hydrophobic material further includes wax or a wax-based product.

26. The method of claim 1, further comprising the step of securing the patch to the pipe portion with an attachment feature.

27. The method of claim 26, wherein the attachment feature comprises adhesive, epoxy, wax, tapes, bands or shrink-wrap.

* * * * *